United States Patent [19]
Ramamurthy et al.

[11] Patent Number: 5,675,384
[45] Date of Patent: Oct. 7, 1997

[54] VBR MPEG VIDEO ENCODING FOR ATM NETWORKS WITH DYNAMIC BANDWIDTH RENEGOTIATION

[75] Inventors: Gopalakrishnan Ramamurthy, Cranbury; Dipankar Raychaudhuri, Princeton Junction; Daniel Jorge Reininger, Princeton, all of N.J.

[73] Assignee: NEC USA, Inc., Princeton, N.J.

[21] Appl. No.: 538,672

[22] Filed: Oct. 3, 1995

[51] Int. Cl.[6] .................................... H04N 7/26
[52] U.S. Cl. .................................... 348/405; 348/419
[58] Field of Search .................................... 348/405, 419, 348/423; 370/468, 470; H04N 7/26

[56] References Cited

U.S. PATENT DOCUMENTS 5,231,484  7/1993  Gonzales .................... 348/405

OTHER PUBLICATIONS

H. Kanakia et al, "An Adaptive Congestion Control Scheme for Real-Time Video Transport," in Proc. of SIGCOM '93, pp. 20–31, 1993.

Primary Examiner—Howard W. Britton
Attorney, Agent, or Firm—Philip J. Feig

[57] ABSTRACT

A system for variable bit-rate video coding in which encoding bandwidth as characterized by a usage parameter control (UPC) parameters is renegotiated between a video encoder and an asynchronous transfer mode network in order to maintain quality-of-service and save bandwidth. The coding system includes adjusting the video source quantization in a manner for controlling the occupancy level of a buffer while new UPC parameters are requested from an ATM network.

8 Claims, 8 Drawing Sheets

VBR MPEG VIDEO ENCODING FOR ATM NETWORKS WITH DYNAMIC BANDWIDTH RENEGOTIATION

FIELD OF THE INVENTION

The present invention relates to a system for variable bit-rate (VBR) video coding in which encoding bandwidth is renegotiated between an encoder and an asynchronous transfer mode (ATM) network during a call. The encoder bandwidth is characterized by a usage parameter control (UPC) set of variables comprising peak rate, burst length and sustained rate. An adaptive encoder rate controller computes the necessary UPC parameters to maintain the user specified quality-of-service (QoS). The network can assign a lower UPC value in order to handle network congestion situations.

BACKGROUND OF THE INVENTION

Traffic generated by computer-based multimedia applications requires true bandwidth-on-demand from an ATM network. A multimedia connection will frequently change its traffic profile during the course of a session because of a user application. This is particularly true for applications using variable bit-rate (VBR) video in which instantaneous bit-rates vary widely with scene content and encoder state. In addition, the user of a software-based multimedia application may want to resize a video window and consequently request a larger image resolution; request a "trick mode" such as fast-forward, rewind, pause or jog from a video server; or suddenly start to browse an image database. ATM networks now under active commercial development are intended to provide support for such diverse video and multimedia applications via the so-called VBR service class.

A new ATM service class that allows bandwidth to be negotiated on demand between a source and the network during a call has been proposed. The new service class, called VBR+, is intended to provide quality of services (QoS) support to computer-based multimedia applications while allowing high network utilization via statistical multiplexing. The VBR service class presently in use for ATM networks requires connections to specify a usage parameter control (UPC) comprising peak-rate, burst-length and sustained rate. The UPC is declared at call set-up time and remains in effect for the duration of the call. Since the MPEG VBR process is non-stationary due to changes in long-term scene activity, it is generally not possible to find a single UPC that will result in uniform video quality for the entire duration of the session without significantly over-dimensioning the initially declared UPC.

The traditional ATM VBR service class supports connections with a static traffic profile pre-established at call set-up. The traffic profile is defined through a set of traffic descriptors or parameters such as peak rate ($\lambda_p$), burst length (BL) and sustained rate ($\lambda_s$). These parameters are referred to as a usage parameter control (UPC) set. The network admits a VBR connection based on its declared UPC. Once the connection is established, it is expected that the terminal device will comply with the declared UPC set. The network may enforce the declared UPC set using a leaky bucket based network policer. A source complies with its UPC set if it produces up to BL consecutive cells with inter-cell spacing of up to $$\frac{1}{\lambda_p}$$

and, until a cell counter is cleared, all the remaining cells arrive with inter-cell spacing of up to $$\frac{1}{\lambda_s}.$$

Each time a cell is admitted, the leaky bucket counter is incremented. The leaky bucket counter is decremented at a constant rate $\lambda_s$. Cells which violate the UPC set are usually marked by a policer and discarded at the switch node where they encounter congestion. In order to avoid cells being discarded, the source must regulate its traffic to conform to the initially declared UPC set. This may be done at the source with a combination of a leaky-bucket traffic shaper, that mirrors the policer mechanism, and source rate control.

The compressed bitstream data produced by a VBR video source is placed in a buffer at the ATM interface. The data is removed from the buffer at the rate specified by the leaky bucket traffic shaper. If the UPC set is properly determined, the buffer content should be close to zero. If the UPC is not properly determined for the VBR traffic of the source, the buffer content increases. When the buffer content increases, the video encoder should reduce its bit-rate by means of a source rate control in order to manage the queue size at the network interface and to guarantee timely delivery of data. However, if the source rate control mechanism engages too often it will result in variable, and possibly unacceptable, service quality. Thus, for acceptable quality-of-service (QoS) of a static UPC VBR connection the user must conservatively over-dimension its declared UPC set at the time of connection set-up. Since the call admission control (CAC) will reserve resources based on the declared UPC parameters for the duration of the connection, it is costly to the user to avoid QoS degradation by UPC over-dimensioning.

Previous studies on VBR video transmission under static UPC have shown that the size of the leaky bucket counter must be quite long (possibly as long as several tens of seconds, which may be prohibitively long from a network designer point of view) to allow uniform picture quality for most of the time during the duration of a video connection. As an alternative to static UPC, dynamic source bandwidth control based only on network feedback has been proposed in an article by H. Kanakia et al entitled "An Adaptive Congestion Control Scheme for Real-Time Packet Video Transport" in Proc. of SIGCOMM '93, Ithaca, N.Y., September 1993.

SUMMARY OF THE INVENTION

The present invention discloses a method for efficiently interfacing variable bit-rate video encoders to ATM networks using dynamic usage parameter control (UPC). Specifically, an algorithm for UPC renegotiation is described for use with VBR MPEG encoders. Renegotiation provides significant quality gains and/or bandwidth savings with minor degradation during UPC renegotiation transients, even in the presence of relatively large round-trip UPC renegotiation delay.

A video encoder provides an interface between a video source and an ATM network. The encoder requests sufficient bandwidth from the ATM network in order to maintain coding quality and limited service delay. The video bandwidth requirement is characterized by usage parameter control parameters comprising peak-rate $\lambda_p$, burst length BL and sustained rate $\lambda_s$. An adaptive VBR video encoder rate-control adjusts the video source quantization in order to control the memory of a buffer in a network interface card (NIC) while at the same time a new set of UPC parameters is requested by a UPC control processor from the call admission control (CAC) in order to maintain the required quality-of-service (QoS).

The ATM network interface card comprises: a UPC control processor for performing the rate-control algorithm which requests new UPC parameters when required and for receiving confirmation from the call admission control (CAC) that the new UPC parameters are accepted by the packetizing of the encoded video for transmission to the ATM network, a buffer for use in conjunction with the rate of transmission of the video, and an ATM interface for coupling the video from the VBR encoder via the buffer to the ATM network.

As a result of applying the novel algorithm, it is possible to maintain quality-of-service while the source quantization is adjusted to control the buffer in the network interface card at the same time new UPC parameters are requested from the ATM network.

The invention will be more clearly understood when the following description is read in conjunction with the accompanying drawing.

DETAILED DESCRIPTION OF THE INVENTION

The system, as will be described below, comprises an adaptive VBR video encoder which connects video signals to an ATM network interface card (NIC) capable of sustaining a VBR connection to an ATM network while there is concurrent UPC parameter renegotiation.

Figure 1:
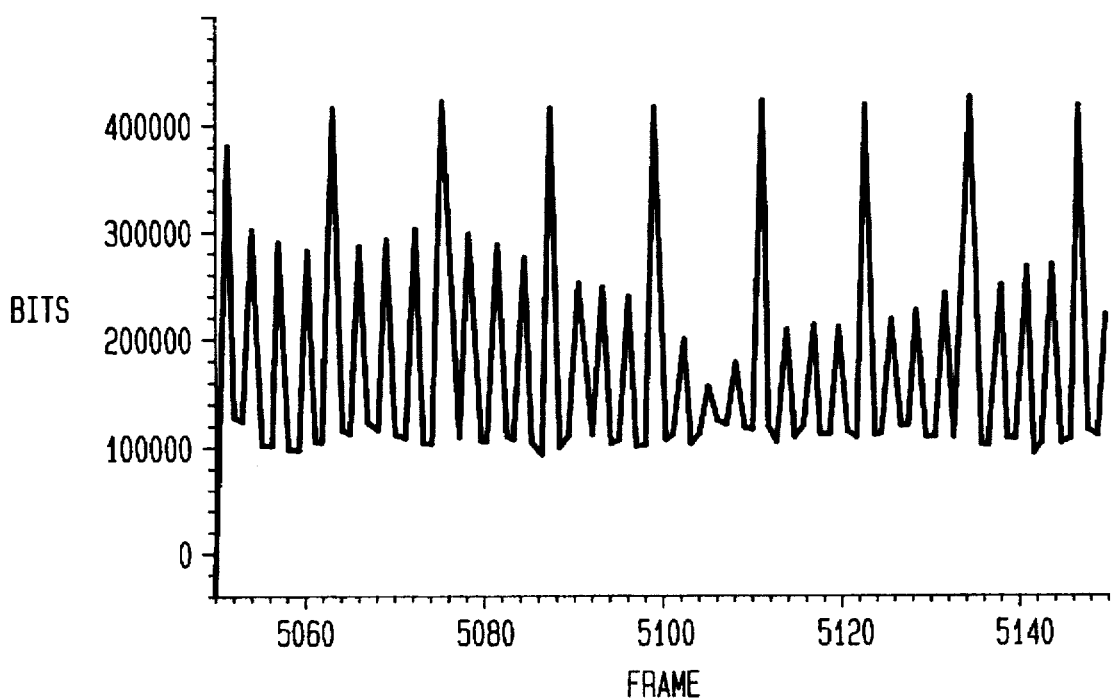
FIG. 1 is a graphical representation of a typical VBR MPEG bit-rate trace.

A VBR video encoder generates an MPEG compressed bitstream from incoming raw digital video. The input video is divided into units of group-of-pictures (GOP's) comprising an Intra (I) picture, coded without reference to other pictures, and arrangement of Predictive (P) pictures, coded with reference to previous (I or P) pictures and Bidirectional or interpolated (B) pictures, coded with reference to an immediate previous (I or P) picture, as well as an immediate future (P or I) picture. The I frame at the beginning of a GOP serves as a basic entry point to facilitate random seek or channel switching and also provides coding robustness to source coding and transmission errors. A GOP is defined by its length N, the distance between I pictures, and M, the distance between P pictures. In the compression sense, I-pictures are the least efficient as they exploit only spatial redundancies, P pictures are more efficient as they exploit causal-temporal, as well as spatial redundancies, and B pictures are the most efficient as they also exploit non-causal-temporal redundancies in addition to those that P-pictures exploit. A segment of a typical VBR MPEG bit-rate trace is shown in FIG. 1 where the I, P and B structure is shown.

Each picture within a GOP comprises one or more slices, the basic unit at which resynchronization information is associated. A slice consists of a row of macroblocks. A macroblock consists of a 16×16 block of luminance along with each of 8×8 block of Cb— and Cr— chrominance blocks. At the encoder, an input macroblock is differenced with its motion-compensated prediction, resulting in a prediction error which is compared with the original (intra) block to determine which would be the most efficient to encode. The chosen macroblock is transformed by a discrete cosine transform (DCT). DCT converts pixel intensities into frequency coefficients. The DCT represents the pixels in a very compact form (i.e., many zero and few non-zero coefficients). The resulting DCT coefficients are quantized with a uniform quantizer with quantization step-size "mquant". The quantized coefficients are variable-length coded. At the macroblock layer, data items such as inter/intra decision, quantizer parameter and motion vectors are transmitted, while at the slice and picture layer, synchronization codes are multiplexed into the MPEG bit-stream. The resulting VBR MPEG bitstream is sent to the port buffer at the NIC.

UPC Estimation

The UPC parameters ($\lambda_p$, $\lambda_s$, BL) necessary to support the encoded VBR video at $Q_{target}$ are determined from the arriving video traffic (compressed bit-stream) at the interface buffer by means of a sliding window of size $UPC_{window}$. Quantization in MPEG is an integer number between 1 and 31. In VBR mode, MPEG encoders use an average —over a frame— quantization triplet $(q_I, q_P, q_B)$ where $$q_I = \frac{q_P}{k^P} = \frac{q_B}{k^B}$$

and $k^B > k^P > 1$, to encode I, P and B frames at uniform quality. The number of bits, $b_Q(n)$, used by the encoder to encode frame n at quantization Q is computed from $$B(n) = B(n-1) + b_Q(n) - R(n) \cdot T, \quad (1)$$

where B(n−1) and B(n) are the buffer occupancies at the NIC, at the beginning and at the end of the frame period T, respectively, and R(n) is the buffer service rate (also referred to as a queue service rate) for frame n.

The required number of bits-per-frame to encode the video frame at $Q_{target}$ can be estimated as $$b_{Q_{target}} = \frac{Q}{Q_{target}} \cdot b_Q(n), \quad (2)$$

where a hyperbolic rate-distortion curve for MPEG VBR video is assumed valid in the small-to-medium range of quantization, i.e., $$X(n) = b_{Q_{target}} \cdot Q_{target} = b_q \cdot Q, \quad (3)$$

where X (n) represents the complexity of frame n.

Once $b_{Q_{target}}$ is estimated, the peak rate to encode the video at $Q_{target}$ is computed as, $$\lambda_p = \frac{1}{T} \cdot \max[b_{Q_{target}}(n)], \quad (4)$$

where $\max[b_{Q_{target}}(n)]$ represents the maximum number of bits-per-frame period T, observed in the sliding window of size $UPC_{window}$ frames.

The sustained rate to encode the frames in the sliding window at $Q_{target}$ is computed as, $$\lambda_s = \frac{1}{T} \cdot \frac{\sum_{n=1}^{UPC_{window}} b_{Q_{target}}(n)}{UPC_{window}}. \quad (5)$$

Finally, the burst length is computed as $$BL = \max[b_{Q_{target}}(n)] + B(n-1). \quad (6)$$

The choice of BL in equation 6 allows the previous buffer content to empty and still be able to service the largest frame in the window at the peak rate, thus adaptively reducing the queueing delay. The value $B(n-1)$ compensates for cumulative errors while the previous UPC parameters were in effect.

$B_{max}$ Updating

A reference value, $B_{max}$, for the maximum queue size in the NIC is adaptively computed as $$B_{max} = (D_{max} - d - e_{max}) \cdot \lambda_s, \quad (7)$$

where $D_{max}$ is the maximum end-to-end delay specified by the application, d is the one-way network delay (i.e., propagation and queueing) and $e_{max}$ is defined as $$e_{max} = \frac{\max(B^s(n) - B_{max})}{\lambda_s} \quad (8)$$

$$B^s(n) = \alpha \cdot B(n) + (1 - \alpha) \cdot B^s(n-1) \quad (9)$$

where $B^s(n)$ is a smoothed value of the instantaneous buffer occupancy at the end of the frame n, $0 \leq \alpha \leq 1$, and the $\max((B^s(n) - B_{max})$ is computed over $UPC_{window}$ frame periods. The value $e_{max}$ compensates the value of $B_{max}$ to avoid queueing delays that exceed the user specified value $D_{max}$. Note that $B_{max}$ is computed using $\lambda_s$, since that is the queue service rate maintained by the leaky bucket when the queue is becoming more congested.

Video Rate Control

The use of source rate control is key for preventive feedback-based congestion control algorithms in broadband networks. The video rate control is responsible for maintaining the queue size in the NIC below $B_{max}$ during the time interval between detecting that the current UPC is inappropriate for the incoming traffic and the time when the appropriate UPC is granted by the network and established at the leaky bucket. Also, once the new UPC is established, the rate control attempts to increase the rate in order to allow the encoder to operate at target quantization.

The rate control algorithm at the UPC controller uses the current values of $B_{max}$ and $B^s$ to update the coding rate for the next frame, $R(n+1)$, according to the following rules:

if$(B^s(n) > th_{f2} \cdot B_{max})$, then $Q(n+1) = Q(n) + 2$;

if$(B^s(n) < th_{f2} \cdot B_{max})$ and $(B^s(n) > th_{f1} \cdot B_{max})$, then $Q(n+1) = Q(n) + 1$;

if$(B^s(n) < th_{D2} \cdot B_{max})$, then $Q(n+1) = Q(n) - 2$;

if$(B^s(n) > th_{D2} \cdot B_{max})$ and $(B^s(n) < th_{D1} \cdot B_{max})$, then $Q(n+1) = Q(n) - 1$;

if$(Q(n+1) > Q_{max})$, then $Q(n+1) = Q_{max}$;

if$(Q(n+1) < Q_{target})$, then $Q(n+1) = Q_{target}$.

and $$R(n+1) = \frac{R(n) \cdot Q(n)}{Q(n+1)} \quad (10)$$

The values of the predetermined thresholds $th_{f2}$, $th_{f1}$, $th_{D2}$, $th_{D1}$ should be selected to provide adequate hysteresis to the control. The last two rules adjust the range of control to a range specified by the application through ($Q_{target}$, $Q_{max}$).

UPC Renegotiation

The control processor in the NIC compares the values of Q and $Q_{target}$ each frame period. If $Q > Q_{target}$ for a predetermined quantity of S frame periods, a $UPC_{up}$ flag is set. Requiring the condition to be present for S frame periods before getting the $UPC_{up}$ flag reduces the quantity of UPC renegotiations by first allowing local parameter adjustment, with the rate control, of transients contained in up to S frame periods. After the $UPC_{up}$ is set, UPC parameters are obtained as described above and requested to the ATM switch. The ATM switch may accept or block the request depending on the current utilization level, bandwidth reservation and status of the QoS contracts on the active connections. If the $UPC_{up}$ request is accepted, the acceptance is sent to the NIC 20 from the CAC. It is important to note that there could be significant delay from the time a UPC renegotiation is triggered at the source until the time the UPC is actually made effective at the leaky bucket. Increasing the value of S and/or smoothing the value of Q over a quantity of frame periods will reduce the renegotiation frequency at the cost of the reactive control being less responsive to degradation in video quality.

If $Q \leq Q_{target}$ and $B^s(n) = 0$ for $L \geq S$ frame periods, a $UPC_{down}$ renegotiation request is made. The predetermined quantity of frame periods L should be sufficiently large to ensure that the measured conditions are steady (not transient) and should be larger than S in order to build hysteresis into changes between $UPC_{up}$ and $UPC_{down}$ states.

Having described in general terms the overall operation of the invention, a preferred embodiment for implementing the invention will now be described in detail.

Figure 2:
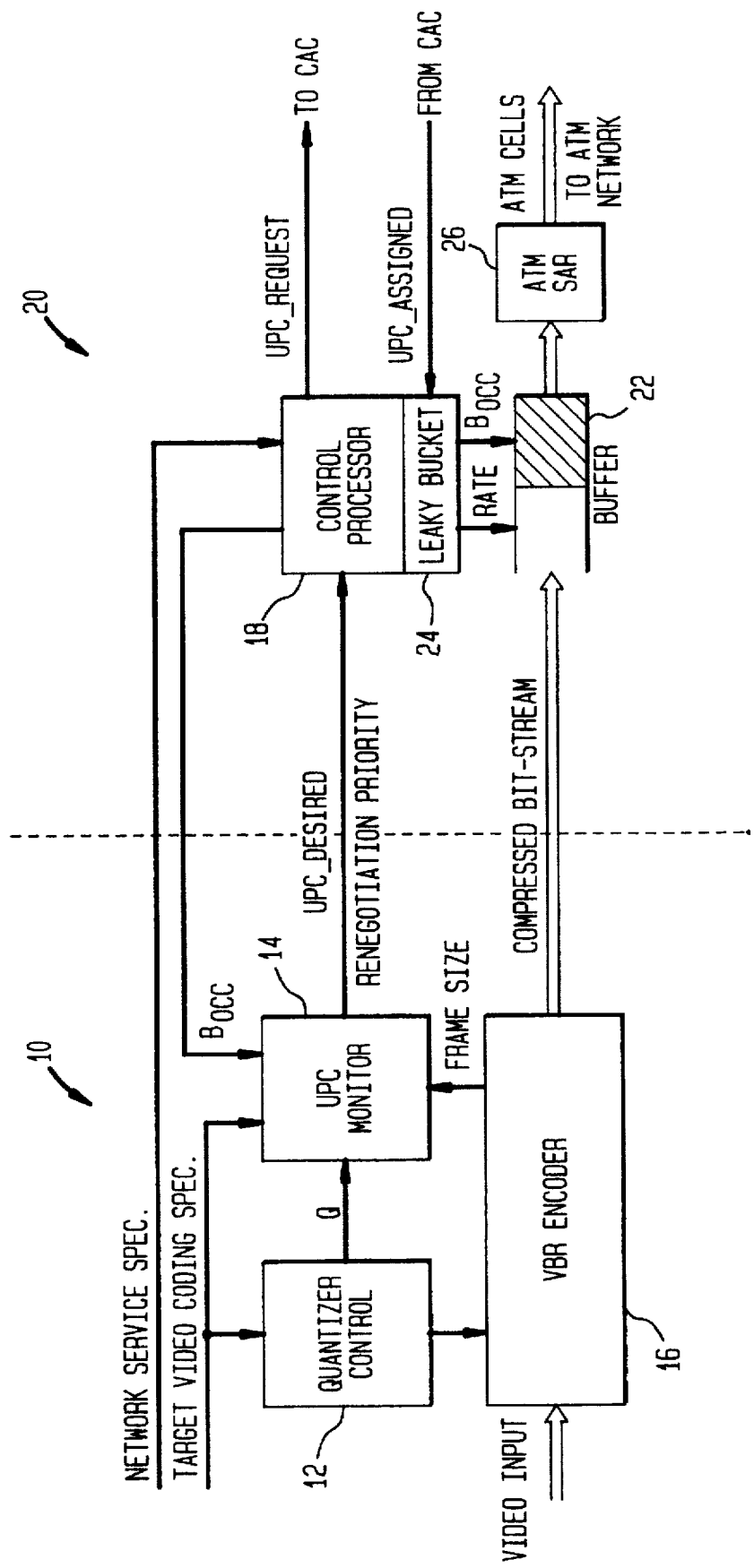
FIG. 2 is a schematic block diagram of an ATM Interface for an MPEG VBR encoder with dynamic UPC.

FIG. 2 shows a preferred embodiment of the interconnection of an adaptive VBR video encoder 10 and an ATM network interface card (NIC) 20 where the VBR video encoder 10 includes a quantizer control 12 and a UPC monitor 14. Quantizer control 12 selects the quantization value Q based on the target video coding rate specified. In addition, the quantizer control sends the quantization value Q during a frame to both the UPC monitor 14 and to the VBR encoder 16. The quantization value Q represents the average of the mquants over the video frame. Since the VBR encoder 16 requires a quantization value for each macroblock (mquant), the quantizer control computes mquant by modulating the target Q with the local coding complexity of the region to be coded. The UPC monitor also receives as inputs the target video coding specified and frame-size (m-bits) information from the VBR encoder 16. The target video coding specification is the desired operating region including quantization range and maximum tolerable delay. A control processor 18 in the NIC 20 runs an algorithm (described below) that triggers a UPC renegotiation request to the ATM network via a call admission control (CAC).

Figure 3:
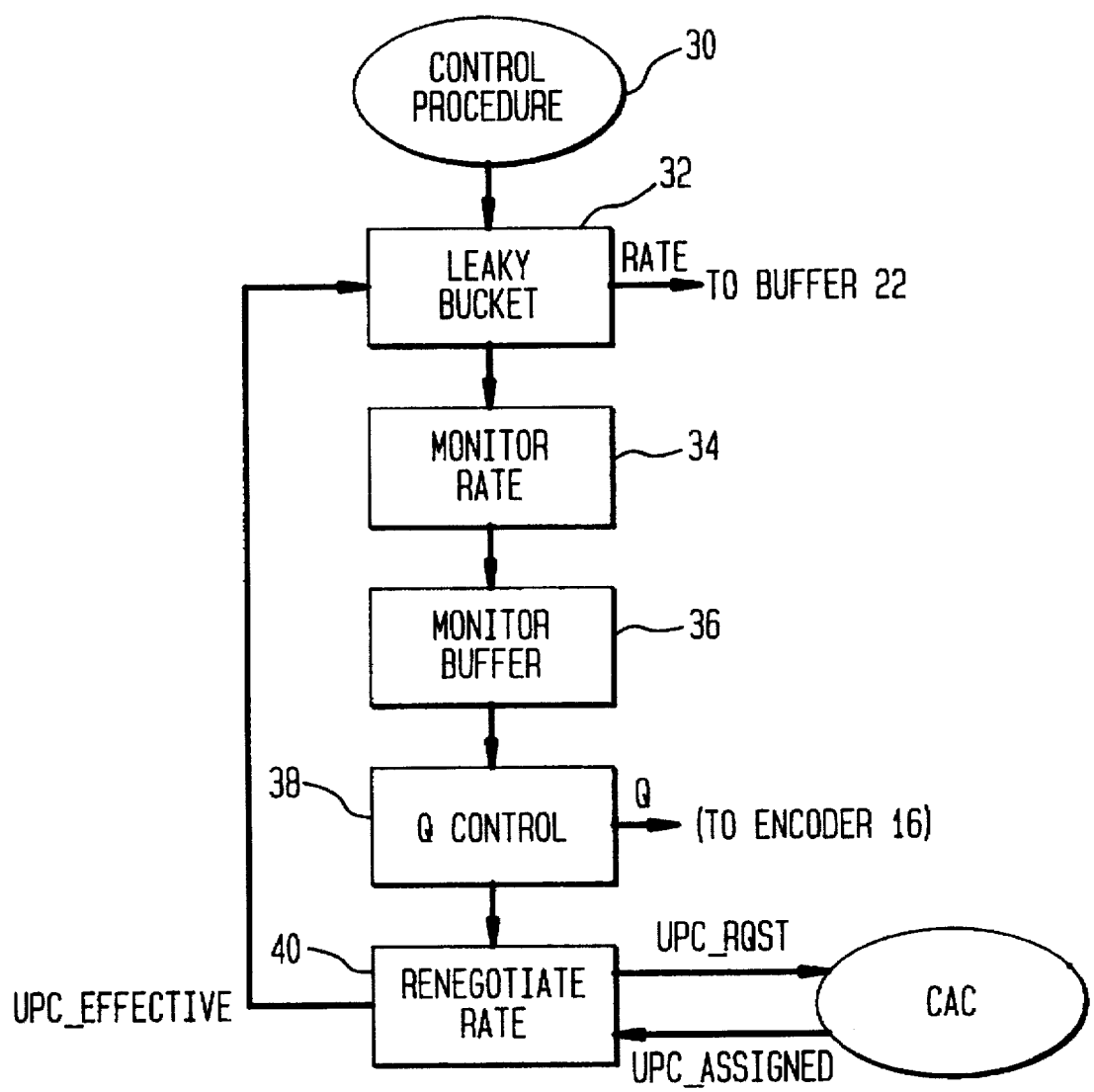
FIG. 3 is a flow chart of the preferred VBR video control procedure.

FIG. 3 is a flow chart of the preferred VBR video control procedure. The control procedure starts 30 with initial specified values for a leaky bucket 32. The rate information from the leaky bucket is provided to an interface buffer 22 for subsequent use in transmitting video data to the ATM network. The rates ($\lambda_p$ and $\lambda_s$) of the transmission from the leaky bucket is monitored 34 by means of computing the maximum rate and the mean rate at a frame time. The occupancy or filing of the monitor buffer 36 is monitored and adjusted as explained below. Information regarding the occupancy of the buffer ($B_{occ}$) is fed to the quantizer control 12 in VBR video encoder 10 where an updated value of Q is determined 38 and provided to the VBR encoder 16. When new and updated values of the UPC parameters are desired, a request for a renegotiated rate 40 is sent to the CAC and the CAC returns a signal indicative of whether the new parameter value request is accepted or not accepted by the ATM network. The UPC parameters to be used (either the present values or the accepted renegotiated values) are provided to the leaky bucket and the process begins anew. The process performed in each of the steps of the procedure will now be described in detail.

Figure 4:
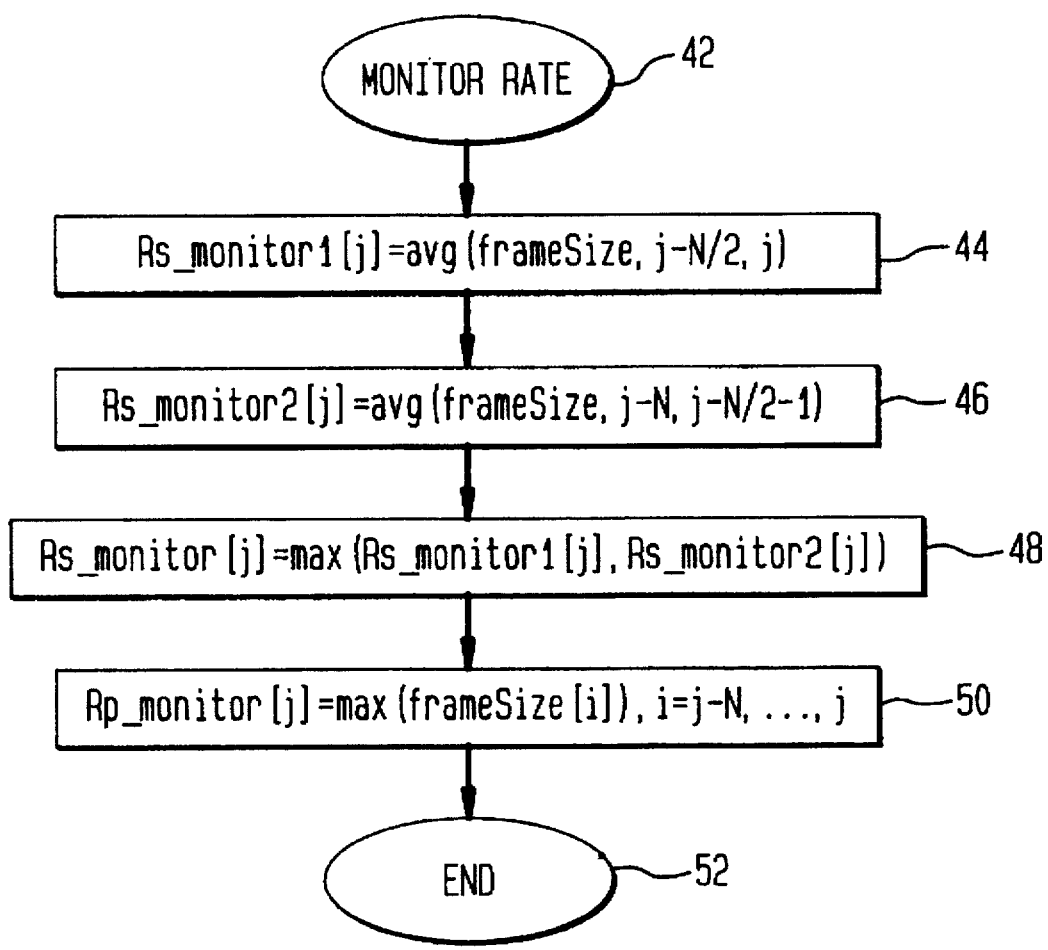
FIG. 4 is a flow chart of the monitor rate algorithm.

FIG. 4 is a flow chart of the monitor rate algorithm. The monitor rate 42 computes the sustained rate and peak rate at frame time j. The computed sustained rate for a frame is calculated 44 as an average rate for a given frame size in relation to the size of a moving window. The monitored sustained rate for the previous frame is also calculated 46. The monitored sustained rate is the maximum of the two calculated rates 48. The monitored peak rate 50 is the maximum for a given frame size over all frames. Having computed the sustained rate and the peak rate at frame time; the monitor rate process ends 52. The monitor rate algorithm is preferably performed in the UPC monitor 14.

The necessary UPC for the encoder to operate at a quantization target value $Q_{target}$ is computed based on the current VBR bit-rate and the current quantization Q value using a rate-distortion model. A maximum buffer occupancy $B_{max}$ is computed based on the acceptable maximum delay $D_{max}$ and an estimate of the propagation delay. The content $B_{occ}$ of buffer 22 is compared with $B_{max}$ and when congestion occurs, the value of the buffer content $B_{occ}$ is sent from the control processor 18 to the UPC monitor 14 in the video encoder 10 in order that the UPC parameters be changed to cause the buffer 22 content to remain less than the value $B_{max}$. The control processor 18 also requests a UPC parameters when the number of frames during which Q is higher than the user specified value $Q_{target}$ exceeds a predetermined threshold value.

Figure 5:
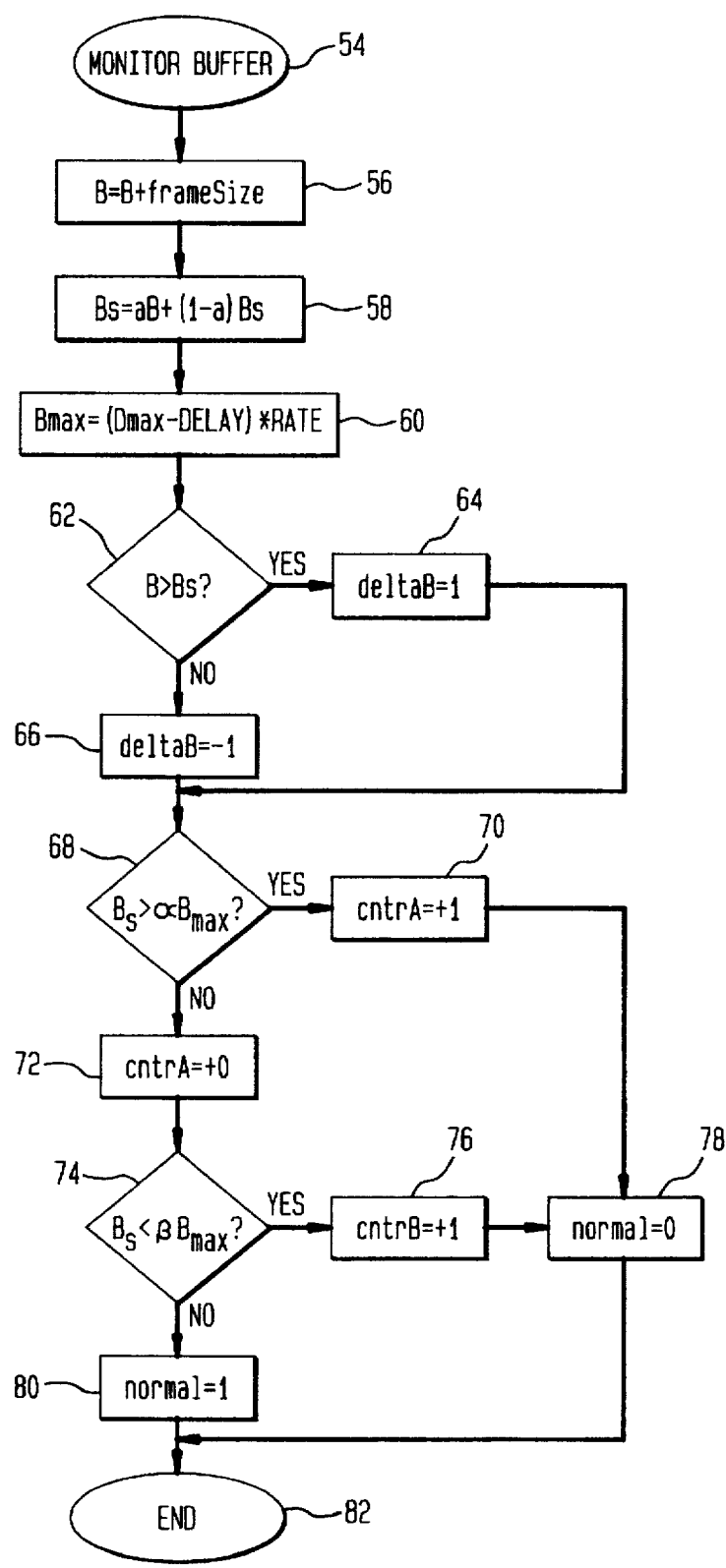
FIG. 5 is a flow chart of the buffer monitor algorithm.

FIG. 5 is a flow chart of buffer monitor algorithm 36, which preferably is performed in quantizer control 12. The process begins 54. The instantaneous buffer occupancy or level B is set equal to the Buffer size B plus the framesize of the video image 56. The instantaneous buffer is "smoothed" ($B_s$) by applying a smoothing factor a so that $B_s$=aB+(1−a)$B_s$ 58. A maximum value of the buffer ($B_{max}$) =($D_{max}$−delay)* rate 60 sets a range on the buffer where $D_{max}$ is the maximum delay a user is able to tolerate, "delay" is the propagation delay inherent in the network and rate is the sustained rate (to be conservative).

A comparison is made whether the instantaneous value of B is greater than the smoothed value $B_s$ 62. If yes, $\Delta$B is incremented 64. If no, $\Delta$B is decremented 66. The resulting $\Delta$B value indicates whether the instantaneous buffer should be increased or decreased.

Another comparison is made whether the smoothed buffer occupancy value $B_s$ is greater than a predetermined percent of the maximum value $B_{max}$ 68. If yes, a first counter Cntr A is incremented 70. If no, the counter Cntr A is unchanged 72. A further comparison is made whether the smoothed buffer occupancy value $B_s$ is less than another, lower, predetermined percent of the maximum buffer occupancy level 74. If yes, a second counter Cntr B is incremented 76 and a normal flag is set to zero 78. If no, the normal flag is set to "1" 80. The process ends 82.

The buffer monitor algorithm determines whether the occupancy is within a range of the maximum buffer occupancy, i.e. between $\beta B_{max}$ and $\alpha B_{max}$. In the preferred embodiment, $\alpha$ is 0.8 and $\beta$ is 0.2. That is, the operation is considered normal if the instantaneous buffer occupancy level is between 20 and 80 percent of the maximum buffer occupancy. If the instantaneous buffer occupancy is outside the range, the UPC parameters have to be changed (through renegotiation) to increase or decrease the buffer occupancy to return to within the desired range in order to maintain an acceptable quality of service.

Figure 6:
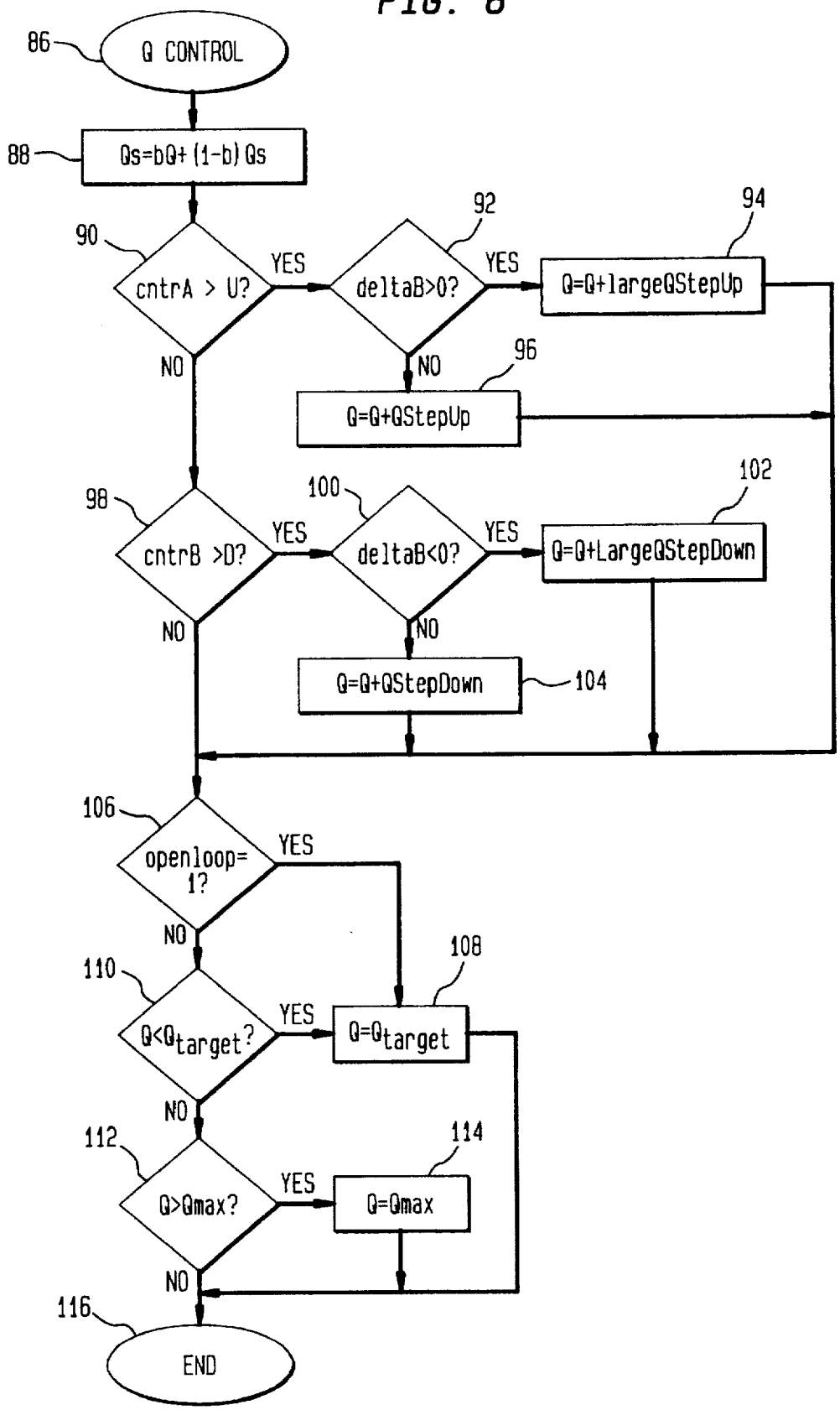
FIG. 6 is a flow chart of the quantization control algorithm.

FIG. 6 is a flow chart of the quantization control algorithm 38 which is performed in conjunction with the buffer monitor algorithm in the quantizer control 12. The process begins 86 and the instantaneous value of Q is smoothed 88 to a value $Q_s$=bQ+(1−b)$Q_s$, where Q is the instantaneous quantization value and b is a predetermined value.

A decision is made whether the count in counter Cntr A is greater than a predetermined value U 90. If yes, another decision is made whether $\Delta$B is greater than zero 92. If yes, the value of Q is incremented by a large increase in Q 94 and the process proceeds to step 106. This process makes a coarse adjustment of the quantization value. If $\Delta$B is not greater than zero in step 92, then Q is increased by a smaller amount 96 and the process proceeds to step 106. This provides a fine incremental adjustment of the quantization value.

If the count in Cntr A is not greater than U in step 90, a decision is made whether the count in counter Cntr B is greater than another predetermined value D 98. If yes, another decision is made whether $\Delta$B is less than zero 100. If yes, the value of Q is decremented by a large decrease in Q 102 and the process proceeds to step 106. If $\Delta$B in step 102 is not less than zero, the value of Q is decremented by a smaller amount 104 and the process proceeds to step 106. This process provides a coarse and fine downward adjustment of the quantization Q.

If the count in Cntr B is not greater than D in step 98, the process proceeds to step 106 where a decision is made whether there is openloop operation. If yes, Q is set to the target value $Q_{target}$ 108 and the process ends 116. The target value is a value set by the application description. If no, a decision is made whether the instantaneous value Q is less than the target value $Q_{target}$ 110. If yes, Q is set equal to $Q_{target}$ 108 and the process ends 116. If no, a decision is made whether Q is greater than $Q_{max}$ 112. $Q_{max}$ is the value of Q beyond which video is useless for a particular application. If yes, Q is set equal to $Q_{max}$ 114 and the process ends 116. If no, the process ends 116 and Q is not changed.

Figure 7A:
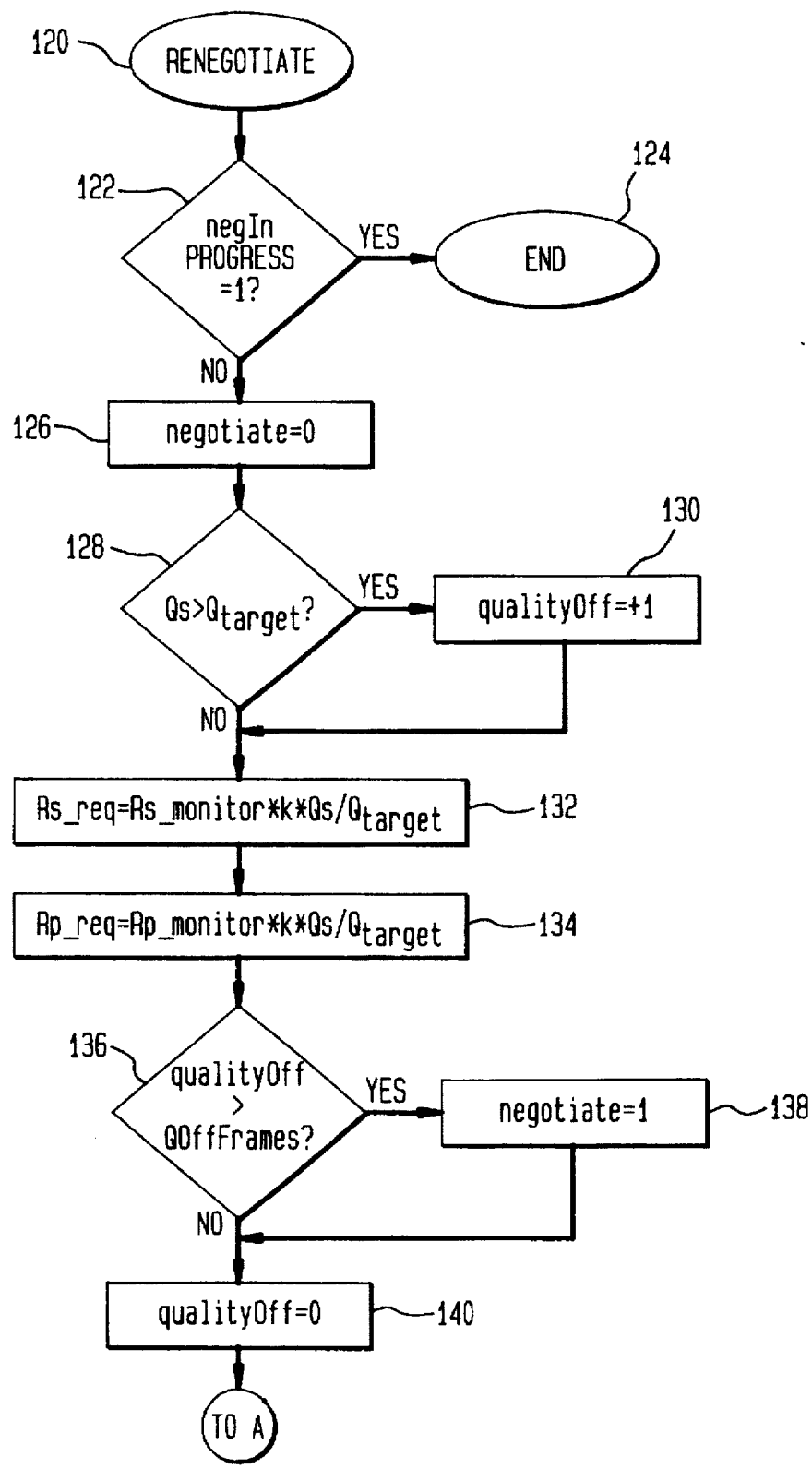
FIGS. 7A and 7B are a flow chart of the renegotiated algorithm.
Figure 7B:
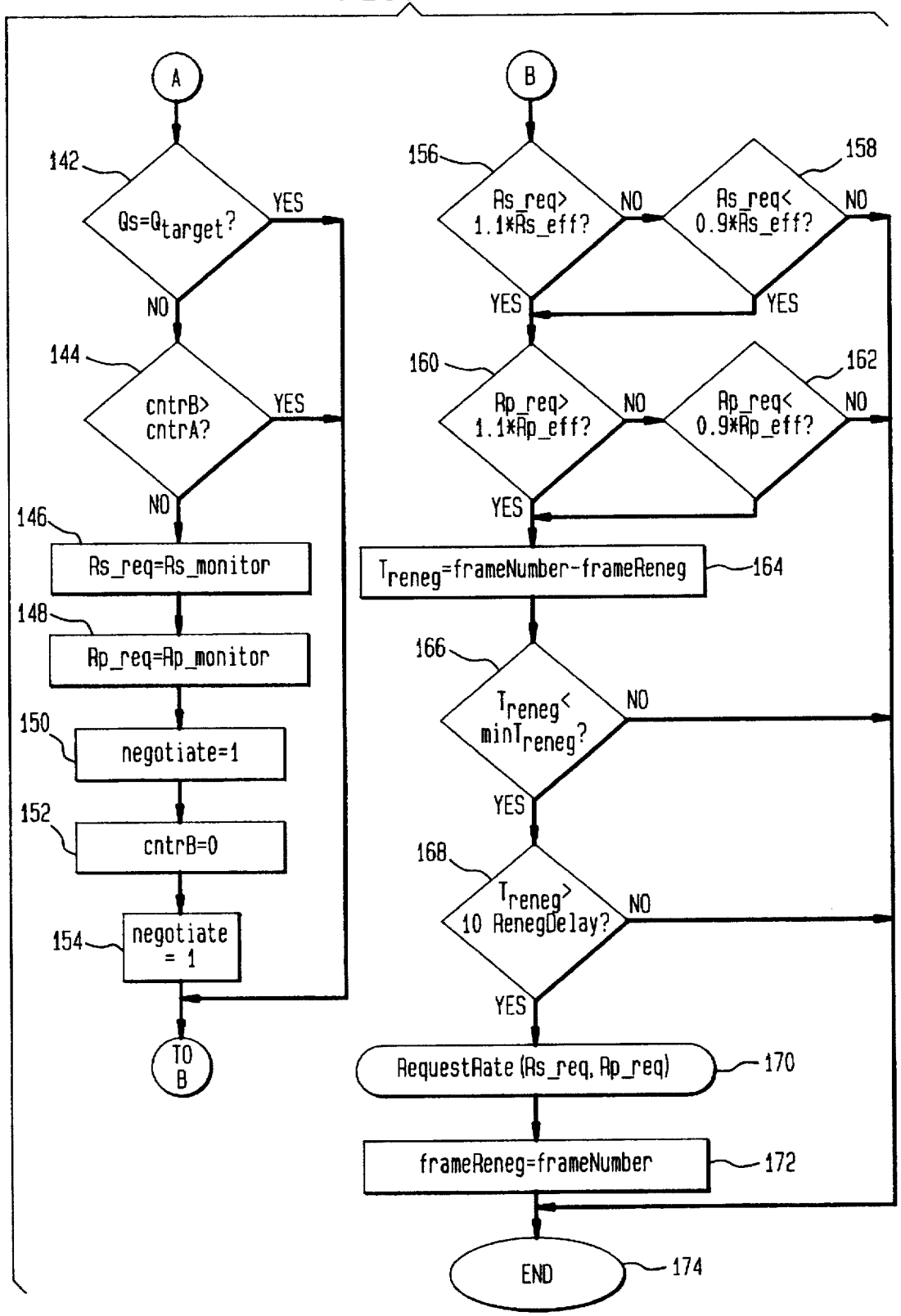

FIGS. 7A and 7B are a flow chart of the renegotiation rate algorithm 40. The renegotiation process begins 120. A determination is made whether renegotiation is already in progress. If yes, the process ends 124. If no, renegotiation is commenced 126.

A decision is made whether the smoothed quantization value $Q_s$ is greater than the target quantization value $Q_{target}$ 128. If yes, the value of qualityOff is incremented 130. QualityOff counts how often $Q_s$ is off target.

A renegotiated sustained rate Rs-req is calculated as a monitored rated multiplied by a predetermined constant k multiplied by the ratio of the smoothed quantization value $Q_s$ divided by the target quantization value $Q_{target}$ in step 132. By a similar calculation, a renegotiated peak rate value is calculated in step 134.

A determination is made whether qualityOff is greater than a predetermined quantity of qualityOff frames 136. If yes, renegotiation continues 138. If no, qualityOff is unchanged 140.

Next, a decision is made whether the smoothed quantization value $Q_s$ is equal to the target quantization value $Q_{target}$ 142. If yes, the process goes to step 156. If no, a determination is made whether the count in counter Cntr B is greater than the count in Cntr A 144. If yes, the process goes to step 156. If no, the requested sustained rate is made equal to the monitored sustained rate 146 and the peak rate requested is made equal to the monitored peak rate 148. The value of negotiate is set to 1 in step 150. The count in counter Cntr B is set to zero in step 152. If negotiate is set to 1, the process continues 154.

A determination is made whether the requested sustained rate is more than a predetermined percent greater than the current sustained rate in effect 156. As shown in the flow chart, the decision is made whether the request preferably exceeds 10 percent (1.1) more than the effective rate. If no, a determination is made whether the requested sustained rate is less than a predetermined percent of the effective sustained rate 158. As shown, the lower threshold is preferably set at 90 percent (0.9) of the effective rate. If no, then the process ends 124. That is, if the requested renegotiated rate is within a predetermined range of the sustained rate currently in effect, no renegotiation will be conducted. Since renegotiation adds a cost to the network, no renegotiation will be performed if the current rate is considered sufficiently close to the to be negotiated rate. The values 0.9 and 1.1 are the preferred values. However, it will be apparent to those skilled in the art that other sized windows may be selected.

If the requested values are outside the range as determined in either step 156 or step 158, a determination is made whether the peak rate to be negotiated is more than a predetermined amount 160 or less than a predetermined percentage 162 of the currently in effect peak rate. Again, the range shown in the flow chart is the same plus or minus ten percent. However, the range need not be the same as that used in conjunction with the sustained rate decisions and the range need not be plus or minus ten percent, but may be any predetermined values. If the determinations in step 160 and step 162 are both no, i.e. the requested peak rate is within the predetermined range, the process will go to end 124. Again, no negotiation of the peak rate will be requested if the to be requested rate is within a predetermined range of the current peak rate.

If the peak rate is outside the predetermined range, the time of the renegotiated frame is calculated as a difference between the current frame number and the frame at which the renegotiated rates will be effective 164. A determination is made whether the calculated value $T_{reneg}$ is less than the $minT_{reneg}$ or less than minimum number of frames necessary to effect the change. If not, the process will end 124. If yes, a determination is made whether the calculated value $T_{reneg}$ exceeds a predetermined multiple of the renegotiated delay 168. The preferred value is ten times. If not, the process ends 124. If the time is within that necessary to effect a change, a rate request for renegotiated values of sustained rate and peak rate are sent to the CAC in step 170 and the frame at which the change is to take effect is sent to the CAC in step 172. The process ends 124. As noted above, the CAC will return a signal indicating whether the new UPC parameters will be accepted by the ATM network. This signal can be extended for the CAC to respond to a UPC request an alternative UPC, indicative of available resources. $T_{reneg}$ also serves as a mechanism to avoid overloading the switch CAC processor with excessive UPC requests.

A leaky bucket 24 clocks the data out of the buffer 22 at the UPC specified rate of $\lambda_p$ or $\lambda_s$ and into an ATM SAR (segmentation and re-assembly) 26 at the corresponding rate based on the dynamic UPC set by the control processor 16. The ATM SAR prepares the compressed data from the buffer 22 for ATM transport and sends the data cells to the ATM network. The ATM SAR segments a bitstream of data into ATM cells with ATM headers. The process of re-assembly is performed at a receiver (not shown) where the headers are removed and the data is reassembled or reconstructed. The ATM network handles the NIC request by carrying out CAC and UPC allocation. The probability of UPC call acceptance is assumed to be equal to one.

Having described and illustrated a preferred method of VBR MPEG video coding with dynamic bandwidth negotiation, it will be apparent to those skilled in the art that modifications and variations are possible without deviating from the spirit and broad principles of the present invention but shall be limited solely by the scope of the claims appended hereto.

What is claimed is:

1. A system for VBR video coding in which encoding bandwidth is renegotiated during a call comprising:

VBR video encoder for generating compressed bit-stream video from input video and for providing frame-size information;

quantizer controller for selecting a quantization value (Q) based on a target video coding specification and providing the value Q to said VBR video encoder and to a UPC monitor;

UPC monitor for receiving the value Q, target video coding specifications and frame size information and calculating desired UPC (usage parameter control) parameters; and control processor for comparing the quantization value Q of a frame with a target quantization ($Q_{target}$) and requesting renegotiation of the desired UPC parameters received from the UPC monitor when the values of Q and $Q_{target}$ are different for a predetermined quantity of frames.

2. A system as set forth in claim 1, further comprising a call admission control associated with an ATM network for receiving the compressed bit-stream video and said control processor requesting renegotiation when the renegotiation time ($T_{reneg}$) exceeds a predetermined multiple of the propagation delay necessary for the call admission control to accept or reject renegotiation.

3. A system as set forth in claim 1, where said UPC monitor calculates desired UPC parameters for the compressed bit-stream video to maintain a predetermined value Q while operating with presently monitored UPC parameters and a target quantization value $Q_{target}$.

4. A system as set forth in claim 1, further comprising a buffer coupled for receiving compressed bit-stream video, where the quantization value Q is selected so that said quantizer controller maintains the occupancy level of said buffer at a level which provides a predetermined maximum end-to-end delay.

5. A method of VBR video coding in which encoding bandwidth is renegotiated during a call comprising the steps of:

generating compressed bit-stream video from input video;

selecting a quantization value (Q) based on a target video coding specification;

calculating desired UPC parameters responsive to the quantization value;

comparing the quantization value Q of a frame and a target quantization value ($Q_{target}$); and sending the desired UPC parameters to a call admission control for renegotiating UPC values when the value Q and value $Q_{target}$ differ for a predetermined quantity of frames.

6. A method as set forth in claim 5, where the renegotiation time ($T_{reneg}$) required for renegotiating UPC parameters exceeds a predetermined multiple of the propagation delay for the call admission control to accept or reject the desired UPC values.

7. A method as set forth in claim 5, where said calculating desired UPC values calculates desired values such that the compressed bit-stream video maintains a predetermined value Q while generating compressed bit-stream video in accordance with current UPC values and a target quantization value ($Q_{target}$).

8. A method as set forth in claim 5, further comprising the step of buffering the compressed bit-stream video and the quantization value Q is selected such that said buffering provides a predetermined maximum end-to-end delay.

* * * * *